United States Patent
Kimmel et al.

(10) Patent No.: US 6,738,685 B2
(45) Date of Patent: May 18, 2004

(54) HAND-HELD TYPE ELECTRICALLY POWERED FASTENER TOOL WITH ON-BOARD CONTROLLER

(75) Inventors: William D. Kimmel, West St. Paul, MN (US); Jeffrey S Aranowski, Sterling Heights, MI (US); Zuher N Khalaf, Troy, MI (US); Leonard V Demchak, Streetsboro, OH (US)

(73) Assignee: The Stanley Works, New Britain, CT (US)

( * ) Notice: Subject to any disclaimer, the term of this patent is extended or adjusted under 35 U.S.C. 154(b) by 0 days.

(21) Appl. No.: 10/320,723

(22) Filed: Dec. 17, 2002

(65) Prior Publication Data

US 2003/0131462 A1 Jul. 17, 2003

Related U.S. Application Data

(60) Provisional application No. 60/340,487, filed on Dec. 18, 2001.

(51) Int. Cl.[7] ................................................ G06F 19/00
(52) U.S. Cl. .......................... 700/168; 81/463; 340/680
(58) Field of Search ........................ 361/818; 700/168; 310/85, 154.44; 81/463–464, 467, 469; 340/680

(56) References Cited

U.S. PATENT DOCUMENTS

| | | |
|---|---|---|
| 3,344,291 A | 9/1967 | Pratt |
| 3,462,623 A | 8/1969 | Batson et al. |
| 3,476,960 A | 11/1969 | Rees |
| 3,651,707 A | 3/1972 | Rees |
| 3,665,228 A | 5/1972 | Jacyno |
| 4,013,946 A | 3/1977 | Lewis |
| 4,410,846 A | 10/1983 | Gerber et al. |
| 4,458,565 A | 7/1984 | Zilly et al. |
| 4,905,423 A | 3/1990 | van Laere |
| 4,920,831 A | 5/1990 | Huang |
| 4,976,173 A | 12/1990 | Yang |
| 5,035,161 A | 7/1991 | Huang |
| 5,076,120 A | 12/1991 | Lin |
| 5,214,326 A | 5/1993 | Yonei |
| 5,412,546 A | 5/1995 | Huang |
| 5,446,722 A | 8/1995 | Kojima et al. |
| 5,661,353 A * | 8/1997 | Erdman et al. ............... 310/86 |
| 5,771,516 A | 6/1998 | Huang |
| 5,886,422 A * | 3/1999 | Mills ........................... 307/29 |
| 5,890,929 A * | 4/1999 | Mills et al. ................. 439/610 |
| 5,903,462 A | 5/1999 | Wagner et al. |
| 5,925,951 A | 7/1999 | Edwards et al. |
| 5,996,707 A | 12/1999 | Thome et al. |
| 6,163,454 A | 12/2000 | Strickler |
| 6,202,285 B1 * | 3/2001 | Bell ............................ 29/596 |
| 6,209,658 B1 | 4/2001 | Yoon |
| 6,229,965 B1 | 5/2001 | Ito et al. |
| 6,275,661 B1 | 8/2001 | Tsujimoto |
| 6,323,575 B1 * | 11/2001 | Devenyi ..................... 310/266 |

* cited by examiner

*Primary Examiner*—Albert W. Paladini
*Assistant Examiner*—Alexander Kosowski
(74) *Attorney, Agent, or Firm*—Pillsbury Winthrop LLP

(57) ABSTRACT

An aspect of the invention provides a hand-held type fastener tool for performing a fastening job using electrical power supplied from an electrical power source. The tool comprises an electrically-powered motor, having an electroconductive outer housing adapted to electrically couple to the earth ground line of the electrical power source, a stator, and a rotor. The motor electrically couples to the live and neutral lines of the electrical power source. An on-board controller is adapted to monitor the fastening job and perform predetermined operations in accordance with the logic scheme based on the monitoring of the fastening job.

The tool further comprises a shield comprising:

(a) an electroconductive element encircling the stator and adapted to electrically couple to the neutral line of the power source,
(b) a first insulation layer encircling the stator between the stator and the electroconductive element, and
(c) a second insulation layer encircling the electroconductive element between the electroconductive element and the electroconductive housing.

12 Claims, 3 Drawing Sheets

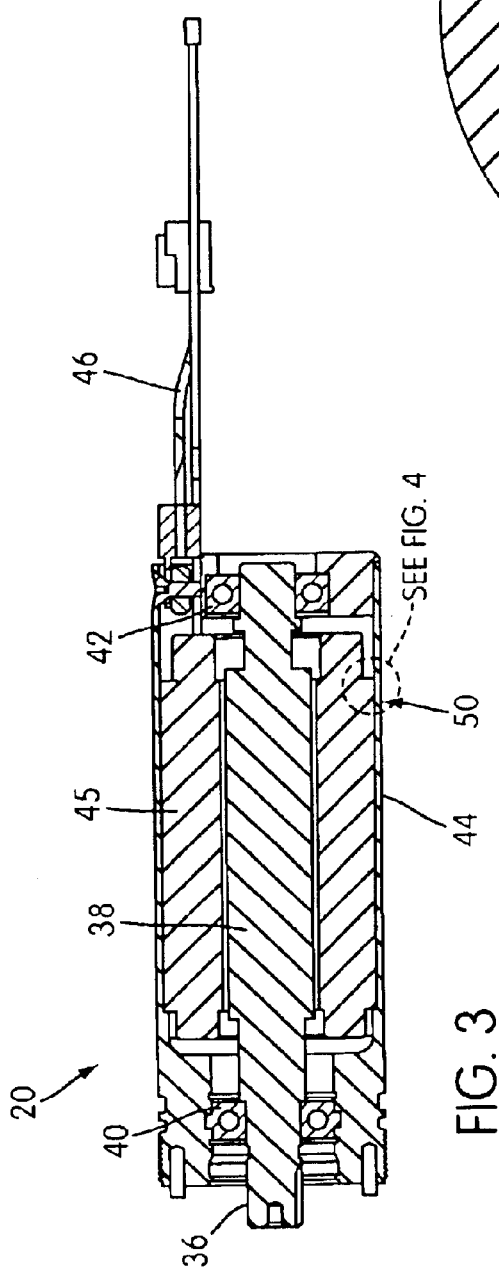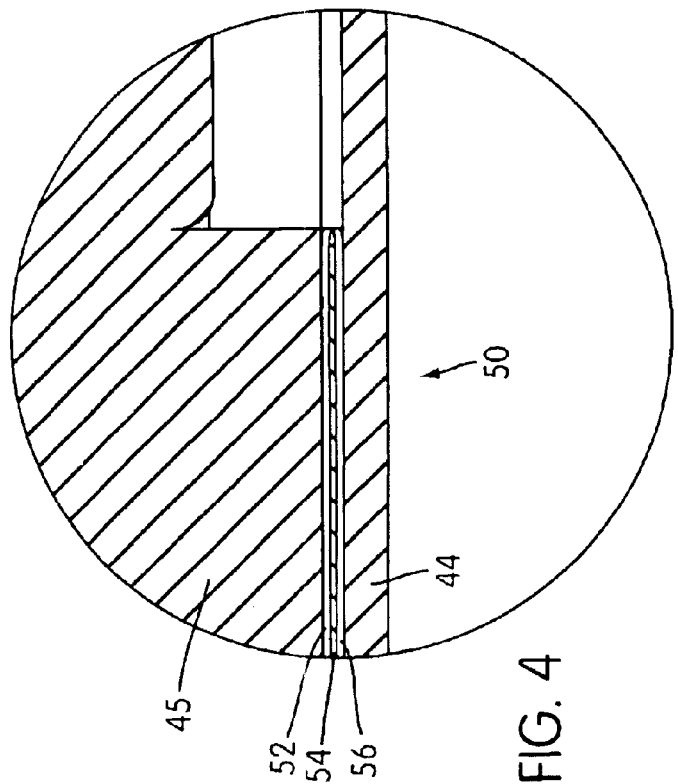

HAND-HELD TYPE ELECTRICALLY POWERED FASTENER TOOL WITH ON-BOARD CONTROLLER

The present application claims priority to U.S. Provisional application of Kemmel et al., Ser. No. 60/340,487, filed Dec. 18, 2001, the entirety of which is incorporated into the present application by reference.

FIELD OF THE INVENTION

The present invention relates to an electrically powered fastener tool, and more particularly to an electrically powered fastener tool with an on-board controller.

BACKGROUND OF THE INVENTION

Electrically powered fastener tools are well-known in the art for applying torque to fasteners. These tools are commonly used in assembly lines for assembling parts together and are often in used in the assembly of automobiles and aircraft, among other things. The typical fastening system has a hand-held tool with a rotatable fastener engaging member and a motor for rotating the member. The user engages the fastener engaging member with a fastener and activates the motor to apply torque to the fastener. A controller is used to monitor the performance of the tool and perform predetermined operations. Such operations may include signaling the user whether the fastening job has been completed or remains uncompleted; or decelerating the speed of the motor as a target torque is approached to prevent torque overshoot.

In conventional systems, this controller has been housed in a stationary unit separate from the tool and is electrically connected to the motor through a set of wires. One reason for housing the controller separate from the tool itself is the electromagnetic noise generated by the tool's motor. Specifically, during operation, the motor generates electromagnetic noise in the form of a flux field as it converts electricity to torque, and this noise may induce currents in the circuitry of the controller or its associated components (particularly where analog signals are used), thereby interfering with the controller's operations and thus overall tool performance. Also, because the motor housing in the tool is electrically coupled to earth ground (for safety purposes in the event a live wire becomes loose and contacts the motor housing), the stationary unit houses large chokes and/or filters for reducing or eliminating noise generated in the earth ground line, which is undesirable and on which there are legal limitations. Specifically, because the motor housing is separated from the motor stator by insulating material, a capacitive coupling effect can create a charge in the motor housing, which in turn is transmitted along the earth ground line as noise. The large filters and/or chokes filter out this noise. Thus, the purpose of the conventional approach of using a stationary unit is two-fold with respect to noise problems created by the motor—(1) to separate the controller from motor noise, and (2) to house the large chokes and/or filters used for reducing or eliminating noise on the earth ground line.

U.S. Pat. No. 5,903,462, the entirety of which is hereby incorporated into the present application for all purposes, discloses a hand-held type fastener tool in which the controller is carried on-board within the housing. However, the '462 patent does not disclose a suitable arrangement for dealing with line emissions in the earth ground line to which the motor housing should be electrically coupled; nor does it provide a solution for minimizing the possibility of inducing currents in the controller circuitry by the motor's flux field. Specifically, the '462 patent does not provide a solution for avoiding the need for large filters and/or chokes on-board in the controller, or in a separate unit along the power cord. Mounting a large filter and/or choke suitable for dealing with such noise to the tool itself is not a practical option, as they are relatively bulky and would add undesirable weight and/or size to a hand-held tool. Although tool controllers typically use small chokes and/or filters, these are not designed for filtering out the noise that is transmitted along the earth ground line. Mounting a large filter and/or choke separately along the power cord is also undesirable as it still requires the use of a separate component for housing the same, and incurs the additional costs attendant with including it on the cord.

SUMMARY OF THE INVENTION

The present invention is directed to providing a design solution that allows a controller to be mounted on-board an electric fastener tool, without the need for using the large filters and/or chokes typically needed for dealing with noise transmitted back along the earth ground line of the power source. Thus, an aspect of the invention provides a hand-held type electrically powered fastener tool for performing a fastening job wherein torque is applied to a fastener using electrical power supplied from an electrical power source having live, neutral, and earth ground lines. The tool comprises a housing constructed and arranged to be manually carried by a user; and an electrically-powered motor. The motor has an electroconductive outer housing adapted to electrically couple to the earth ground line of the electrical power source, a stator received within the outer housing, and a rotor received within the outer housing and rotatable relative to the stator. The motor electrically couples to the live and neutral lines of the electrical power source and converts electrical power from the electrical power source into rotation of the rotor. Preferably, the motor is electrically coupled to the power source indirectly through the controller for allowing the controller to control the motor. A fastener engaging member is carried on the housing. The fastener engaging member is operatively connected to the rotor of the motor for rotation therewith and is engageable with a fastener in torque transmitting relation to enable a fastening job to be performed by engaging the fastener engaging member with the fastener and supplying electrical power to the motor to affect rotation of both the rotor and the fastener engaging member to thereby apply torque to the fastener. An on-board controller is carried on the housing and operable in accordance with a logic scheme. The controller is adapted to monitor the fastening job and perform predetermined operations in accordance with the logic scheme based on the monitoring of the fastening job. Preferably, this includes controlling the motor in accordance with a logic scheme based on feedback from within the tool.

The tool further comprises a shield comprising:

(a) an electroconductive element encircling the stator and adapted to electrically couple to the neutral line of the electrical power source, (b) a first insulation layer encircling the stator between the stator and the electroconductive element so as to insulate the electroconductive element from the stator, and (c) a second insulation layer encircling the electroconductive element between the electroconductive element and the electroconductive housing so as to insulate the electroconductive housing from the electroconductive element.

By electrically coupling the motor housing to the earth ground line, the safety of grounding the motor housing is achieved. Moreover, by electrically coupling the electroconductive element to the neutral line of the power source, the motor noise, including any current induced in the electroconductive element and/or charge created in the electroconductive element, is transmitted to the neutral line back to the power source, instead of along the earth ground line via the motor housing. While some minor capacitive coupling may occur (but not necessarily) between the electroconductive element and the motor housing, this amount is relatively small and is not problematic.

Optionally, the electroconductive element is a metallic mesh element, and may be made of copper.

Also optionally, the tool's controller may further comprise an AC/DC rectifier for electrically coupling the controller to the power source. The AC/DC rectifier would have at least live and neutral terminals for electrically coupling to the live and neutral terminals of the power source, respectively, and the electroconductive element would be electrically coupled to the neutral terminal of the AC/DC rectifier.

Other objects, features, and advantages of the present invention will become apparent from the following detailed description, the accompanying drawings, and the appended claims.

BRIEF DESCRIPTION OF THE DRAWINGS

FIG. 3 is a sectional view of a motor used in the tool of FIG. 1, the section being taken along the axis of the motor; and FIG. 4 is a close-up view of the subject matter depicted in FIG. 2 to show the flux shield that encircles the motor.

DETAILED DESCRIPTION OF THE INVENTION

Figure 1:
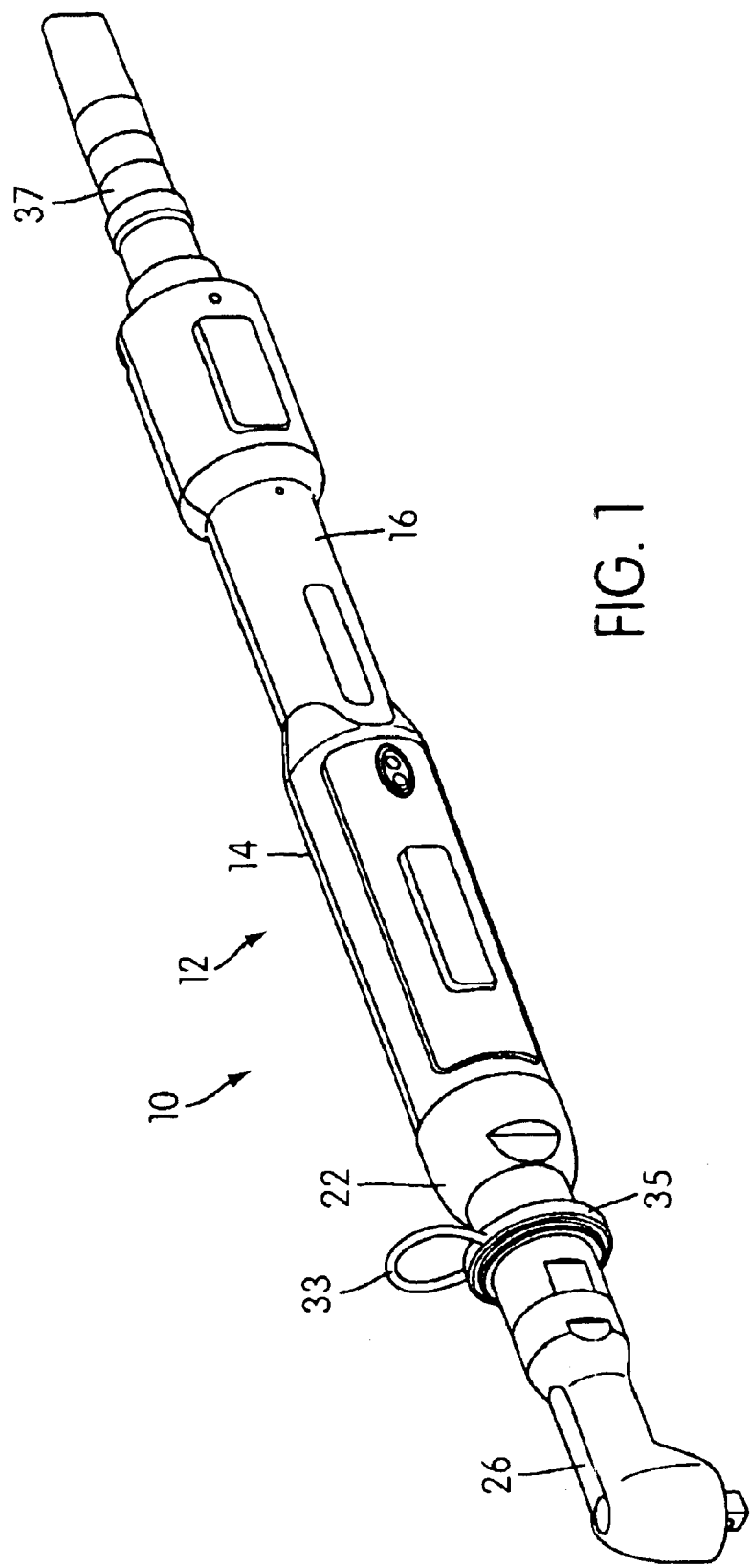
FIG. 1 is a perspective view of a hand-held fastener tool constructed in accordance with the principles of the present invention.
Figure 2:
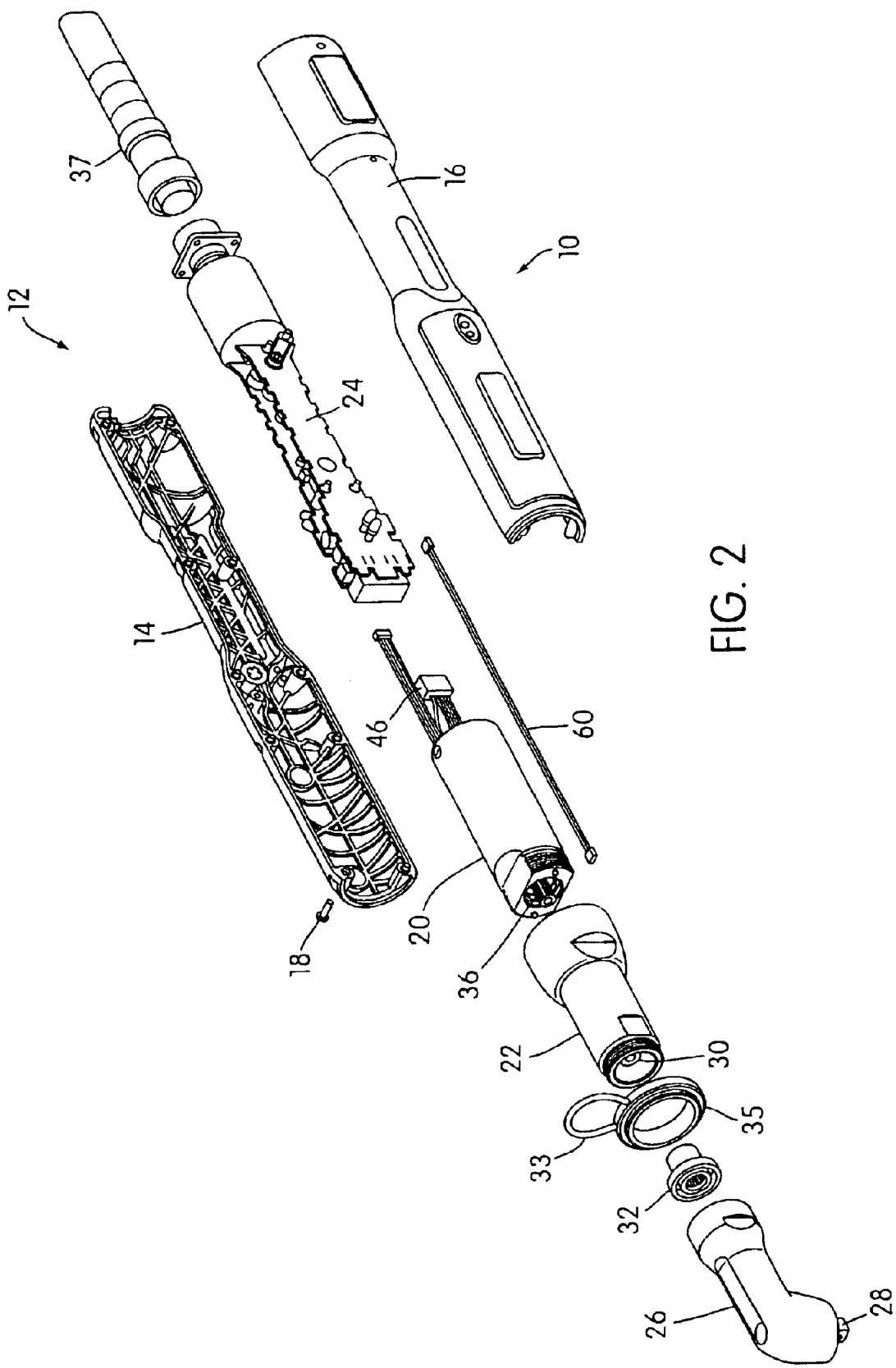
FIG. 2 is an exploded view of the tool illustrated in FIG. 1.

FIG. 1 illustrates an electrically powered fastener tool, generally indicated at 10, constructed in accordance with the principles of the present invention; and FIG. 2 illustrates an exploded view of the tool 10. The tool 10 comprises an elongated housing 12 formed of two complementary halves 14, 16 that are fastened together by a plurality of fasteners, one of which is shown at 18. The construction of the housing 12 is not particularly critical and may take any suitable form or be made of any suitable material. The tool 10 also comprises an electric motor 20 mounted within the housing 12, a reduction gear transmission 22 mounted to the front end of the housing 12, a controller 24 that mounts within the housing 12, and an angle head assembly 26 that attaches to the front end of the transmission 22.

The angle head assembly 26 has a rotatable fastener engaging member 28 on the end thereof, which is oriented perpendicularly to the longitudinal axis of the tool 10. The member 28 may be designed to engage a specific type of fastener directly, or may be a lug as shown designed to receive removable sockets (not shown) thereon for engaging different types of fasteners. The opposite side of the assembly 26 has an input member (not shown) and an internal bevel gear arrangement (not shown) interconnects the input member to the fastener engaging member 28. This transmits rotation of the input member about the longitudinal axis of the tool 10 to rotate the engaging member 28 about its perpendicular axis.

The transmission 22 has an output member 30 at the forward end thereof. This output member 30 is fixedly connected to the input member of the angle head assembly 28 by an adapter 32 positioned therebetween. This enables rotation of the output member 30 to rotate the input member, which is turn rotates the fastener engaging member 28.

A bail handle 33 is mounted over the transmission 22 by annular collar 35. The bail handle 33 may be used to hang the tool 10 for storage between jobs.

The motor 20 has an output member 36 provided on the end of its rotor 38 (FIG. 3). The output member 36 is coupled to an input member (not shown) of the transmission 22. This enables rotation of the rotor 38 to rotate the input member of the transmission 22. The input member of the transmission 22 is coupled to its output member 30 by a series of gears arranged therebetween. The gears are selected so that the output member 30 rotates at a lower rate, but higher torque, than the input member. This increases the amount of torque eventually transmitted to the fastener engaging member 28 via the angle assembly 26.

The motor 20 also includes a pair of ball bearings 40, 42 for rotatably supporting the rotor 38, a tubular metal housing 44, a stator 45 and connector wiring 46 for electrically coupling to the controller 24. The motor 20 is of the D.C. brushless type and operates in a conventional manner, although any other type of motor having any suitable construction or configuration may be used. In the illustrated embodiment, the electricity delivered from the power source by the controller to the stator 45 is controlled to sequentially switch the stator's poles on/off. Each time the poles are switched, a flux field is generated, and it is this flux field that may induce current in the circuitry of the controller 24, as discussed above in the background section. Also, capacitive coupling may be created between the stator and any electroconductive element adjacent to it, as discussed in the background section. To minimize this problem, a shield 50 is provided, which will be discussed in further detail below.

The controller 24 operates in accordance with a logic scheme and monitors the fastening job being performed. The controller 24 also performs predetermined operations in accordance with the logic scheme based on the monitoring of the fastening job. For example, such predetermined operations may include signaling the user whether the fastening job has been completed or remains uncompleted; or decelerating the of speed the motor as a target torque is approached to prevent torque overshoot, as shown in commonly owned U.S. Pat. No. 5,315,501 to Whitehouse, the entirety of which is hereby incorporated into the present application by reference. Usually, this is determined by receiving feedback from a transducer (not shown) that measures the amount of torque being applied, and often these transducers and the controller use analog signals, which are usually particularly sensitive to noise, although digital componentry may be somewhat sensitive, but not as much as analog componentry. The transducer may be of any type. For example, it may be a strain gauge type transducer for measuring strain in a component of the transmission. The types of transducers used are well known and need not be detailed herein. The particular operations performed by the controller 24 are not critical and should not be considered limiting on the invention. Any suitable type of controller 24 may be used.

The controller 24 may connect to the power source by a cable 37 that connects at the rear end of the tool 10 and includes at least the live, neutral, and earth ground lines. The cable 37 may, for example, be used solely for delivering power, or may also be used for uploading/downloading data related to fastening jobs from a centralized computer system.

The shield 50 comprises a first layer of insulation material 52, preferably Capton, adhered to and encircling the stator 45 about essentially its entire circumference and length. An electroconductive element 54 is adhered to and encircles the insulation material 52 about essentially its entire circumference and length. The preferred electroconductive element 54 is a thin copper mesh, but any material may be used. A second layer of insulation material 56, also of Capton, is adhered to and encircles the electroconductive element 54 about essentially its entire circumference and length. The first insulation material 52 insulates the electroconductive element 54 from the stator 45 and the second insulation material 56 insulates the electroconductive element 54 from the housing 44. Together, these insulation materials 52, 56 substantially isolate the electroconductive element 54 from the remainder of the tool 10.

The electroconductive element 54 is coupled to the neutral terminal of the AC/DC rectifier (not shown) that connects to the power source via cable 37, specifically to the neutral line of the power source. This enables any current induced in the electroconductive element 54 by the motor's flux field to be transferred to the power source along the neutral line when the cable 37 is coupled to the source. Also, any charge created by capacitive coupling between the element 54 and the stator 45 is transferred to the power source along the neutral line when the cable 37 is connected to the source. This reduces the chances of current being induced in the circuitry of the controller 24. Also, the housing 44 is electrically coupled to the earth ground of the system, specifically the earth ground of the power source when the cable 37 is connected to the source, and the use of the shield 50 reduces the amount of noise transmitted along the line connected to the earth ground. Specifically, because of the presence of the shield 50, any charge or current created in the electroconductive element 54 will be transmitted to the power source neutral line instead of being transmitted to earth ground via the housing 44. This is more desirable as noise on the neutral line is less problematic than noise on the earth ground line, and thus avoids the need for large chokes and/or filters in the tool or on the power line for filtering out such noise on the earth ground line. Of course, smaller chokes and/or filters may be used in the controller 24 to protect various components therein from noise, but these chokes will be small in comparison to the type typically used to filter out noise from the earth ground line.

In the illustrated embodiment, the transducer is electrically coupled to the controller 24 by a ribbon cable 60 carrying analog signals. As can be appreciated from FIG. 2, this cable 60 passes immediately adjacent motor 20, and thus is likely to be affected by any flux field generated by the motor 20, which may induce current in the cable wiring and thus interfere with tool performance. The use of shield 50 is particularly advantageous for this arrangement as it reduces or eliminates the induction of such currents in the cable wiring. However, it should be understood that the invention is not limited to this illustrated arrangement or achieving this particular advantage, and this is only being disclosed as an advantage of the particular exemplary embodiment illustrated. Any other arrangement may be used for coupling the controller 24 to the transducer.

By mounting the controller on the tool, other advantages are achieved. Specifically, portability of the tool is improved. Also, signal integrity is improved because the distance between the controller and the components to which it is connected is minimized, and thus shorter wires are used, thus improving the integrity of the signal transmitted along those wires.

The foregoing detailed embodiment has been provided solely to illustrate the functional and structural principles of the present invention and is not intended to be limiting. To the contrary, the present invention is intended to encompass all substitutions, alterations, and equivalents within the spirit and scope of the following claims. Any advantages stated herein are not intended to be limiting with respect to the claims and should be considered optional advantages achieved by the illustrated embodiment.

What is claimed:

1. A system comprising:
   an electrical power source having live, neutral, and earth ground lines, and
   a hand-held type electrically powered fastener tool for performing a fastening job wherein torque is applied to a fastener using electrical power supplied from the electrical power source, the tool comprising:
   a housing constructed and arranged to be manually carried by a user;
   an electrically-powered motor having (a) an electroconductive outer housing electrically coupled to the earth ground line of the electrical power source, (b) a stator received in the outer housing, and (c) a rotor received in the outer housing and rotatable relative to the stator, the motor being electrically coupled to the live and neutral lines of the electrical power source and operable to convert electrical power from the electrical power source into rotation of the rotor;
   a fastener engaging member carried on the housing, the fastener engaging member being operatively connected to the rotor of the motor for rotation therewith and being engageable with the fastener in torque transmitting relation to enable the fastening job to be performed by engaging the fastener engaging member with the fastener and supplying electrical power to the motor to affect rotation of both the rotor and the fastener engaging member to thereby apply torque to the fastener;
   an on-board controller carried on the housing and operable in accordance with a logic scheme, the controller being adapted to monitor the fastening job and perform predetermined operations in accordance with the logic scheme based on the monitoring of the fastening job; and
   a shield extending axially between the stator and the electroconductive outer housing, the shield comprising:
   (a) an electroconductive element encircling the stator and electrically coupled to the neutral line of the electrical power source,
   (b) a first insulation layer encircling the stator between the stator and the electroconductive element so as to insulate the electroconductive element from the stator, and
   (c) a second insulation layer encircling the electroconductive element between the electroconductive element and the electroconductive outer housing so as to insulate the electroconductive outer housing from the electroconductive element.

2. A system according to claim 1, wherein the electroconductive element is a metallic mesh element.

3. A system according to claim 2, wherein the metallic mesh element is formed of copper.

4. A system according to claim 1, wherein the controller further comprises an AC/DC rectifier for electrically coupling to the power source, the AC/DC rectifier having at least live and neutral terminals electrically coupled to the live and neutral lines of the power source, respectively, wherein the electroconductive element is electrically coupled to the neutral terminal of the AC/DC rectifier.

5. A system according to claim 4, wherein the controller is electrically coupled to the motor and wherein the predetermined operations of the controller includes controlling the motor in accordance with the logic scheme based on the monitoring of the fastening job.

6. A system according to claim 1, wherein the controller is electrically coupled to the motor and wherein the predetermined operations of the controller includes controlling the motor in accordance with the logic scheme based on the monitoring of the fastening job.

7. A hand-held type electrically powered fastener tool for performing a fastening job wherein torque is applied to a fastener using electrical power supplied from an electrical power source having live, neutral, and earth ground lines, the tool comprising:

a housing constructed and arranged to be manually carried by a user;

a set of terminals for electrically coupling to the electrical power source, including a live terminal for electrically coupling to the live line, a neutral terminal for electrically coupling to the neutral line, and an earth ground terminal for electrically coupling to the earth ground line;

an electrically-powered motor having (a) an electroconductive outer housing electrically coupled to the earth ground terminal so as to be electrically coupled to the earth ground line when the set of terminals is electrically coupled to the electrical power source, (b) a stator received in the outer housing, and (c) a rotor received in the outer housing and rotatable relative to the stator, the motor being electrically coupled to the live and neutral terminals so as to be electrically coupled to the live and neutral lines, respectively, when the set of terminals is electrically coupled to the electrical power source, the motor being operable to convert electrical power from the electrical power source into rotation of the rotor when the set of terminals is electrically coupled to the electrical power source;

a fastener engaging member carried on the housing, the fastener engaging member being operatively connected to the rotor of the motor for rotation therewith and being engageable with the fastener in torque transmitting relation to enable the fastening job to be performed by engaging the fastener engaging member with the fastener and supplying electrical power to the motor to affect rotation of both the rotor and the fastener engaging member to thereby apply torque to the fastener;

an on-board controller carried on the housing and operable in accordance with a logic scheme, the controller being adapted to monitor the fastening job and perform predetermined operations in accordance with the logic scheme based on the monitoring of the fastening job; and a shield extending axially between the stator and the electroconductive outer housing, the shield comprising:
(a) an electroconductive element encircling the stator and electrically coupled to the neutral terminal so as to be coupled to the neutral line when the set of terminals is electrically coupled to the electrical power source,
(b) a first insulation layer encircling the stator between the stator and the electroconductive element so as to insulate the electroconductive element from the stator, and
(c) a second insulation layer encircling the electroconductive element between the electroconductive element and the electroconductive outer housing so as to insulate the electroconductive outer housing from the electroconductive element.

8. A tool according to claim 7, wherein the electroconductive element is a metallic mesh element.

9. A tool according to claim 8, wherein the metallic mesh element is formed of copper.

10. A tool according to claim 7, wherein the controller further comprises an AC/DC rectifier for electrically coupling to the power source, the AC/DC rectifier providing at least the live and neutral terminals for electrically coupling to the live and neutral lines of the power source, respectively, wherein the electroconductive element is electrically coupled to the neutral terminal of the AC/DC rectifier.

11. A tool according to claim 10, wherein the controller is electrically coupled to the motor and wherein the predetermined operations of the controller includes controlling the motor in accordance with the logic scheme based on the monitoring of the fastening job.

12. A tool according to claim 7, wherein the controller is electrically coupled to the motor and wherein the predetermined operations of the controller includes controlling the motor in accordance with the logic scheme based on the monitoring of the fastening job.

* * * * *